United States Patent [19]

Small et al.

[11] Patent Number: 4,522,428
[45] Date of Patent: Jun. 11, 1985

[54] PRINTED MAGNETIC ENCODING PANEL

[75] Inventors: Edward A. Small, Nepean; Geoff C. Wright, Ottawa, both of Canada

[73] Assignee: British American Bank Note Inc., Ottawa, Canada

[21] Appl. No.: 440,858

[22] Filed: Nov. 12, 1982

[30] Foreign Application Priority Data

Nov. 4, 1982 [CA] Canada .................................. 414931

[51] Int. Cl.³ .................. B42D 15/00; G11B 5/00; G06K 7/08
[52] U.S. Cl. ........................... 283/82; 283/83; 360/4; 235/449
[58] Field of Search ............ 283/82, 83, 904; 235/449; 360/4; 525/382; 101/128; 428/204, 900

[56] References Cited

U.S. PATENT DOCUMENTS 2,914,746 11/1959 James .................. 525/382
3,245,697 4/1966 Nugent ................. 283/82
3,401,394 9/1968 Leonard et al. ....... 360/4
3,453,598 7/1969 Schweizer ............. 235/449
3,987,725 10/1976 Scantlin ............... 101/128
4,100,011 7/1978 Foote .................. 283/82

FOREIGN PATENT DOCUMENTS 983370 2/1976 Canada .
996255 8/1976 Canada .
1249754 10/1971 United Kingdom .
1482760 8/1977 United Kingdom .
1590439 6/1981 United Kingdom .

Primary Examiner—Paul A. Bell
Assistant Examiner—Paul M. Heyrana, Sr.
Attorney, Agent, or Firm—Cushman, Darby & Cushman

[57] ABSTRACT

This invention relates to a plastic identification card. A magnetic encoding panel is printed, preferably by screen printing. This enables the magnetic encoding panel to be applied more economically than with conventional magnetic tapes. The printing of the magnetic encoding panel is applied to a drop out area in the transparent protecting coating, followed by polishing both of the protective coating and the printed magnetic encoding panel. This greatly increases the passes through a reader prior to failure of the magnetic encoding panel.

4 Claims, 3 Drawing Figures

PRINTED MAGNETIC ENCODING PANEL

This invention relates to plastic identification cards having a printed magnetic encoding panel. The term plastic identification cards is intended to include credit cards and similar cards such as debit cards, insurance cards, transaction cards and the like.

Plastic identification cards often include a magnetic tape in the form of a strip adhered to the back of a card. This tape carries information which may be permanent or transitory as to matters such as the ownership of the card and the state of the account.

The processing of plastic identification cards to affix the magnetic tape is a costly operation, as according to previous practice in the North American continent, each card is dealt with individually. The identification card with the magnetic tape will have a raised tape portion at a different height from the remainder of the card. Problems of failure are sometimes encountered after a number of passes through a reader.

It is understood that printing of magnetic encoding means has been attempted in Europe but we are not aware of the technique used or the results obtained.

An object of this invention is to provide a magnetic encoding panel which can be applied to plastic identification cards more easily and less expensively than in accordance with conventional practice.

A further object of this invention is to avoid the raised magnetic area characteristic of present plastic identification cards.

Another object of this invention is to provide a magnetic encoding panel which will withstand more passes through a reader than a conventional plastic identification card.

In accordance with this invention a magnetic panel is applied to the plastic identification card by printing, preferably screen printing, and is polished.

In accordance with another aspect of this invention, the plastic identification card is first printed with a protective coating of transparent film leaving a so-called drop out area free from the transparent film, then the magnetic panel is applied to this drop out area, following which both the transparent film and the magnetic panel are polished. This invention results in more economical manufacture as it is possible to print the magnetic panel on a batch of several dozen identification cards simultaneously. This invention also provides a product in which the raised surface of the conventional identification card magnetic tape has been eliminated and also results in a card which permits a greater number of passes through a reader than a conventional card.

Other inventive features and advantages will be apparent from the detailed description.

In the drawings which illustrate the preferred embodiment of this invention:

Figure 1:
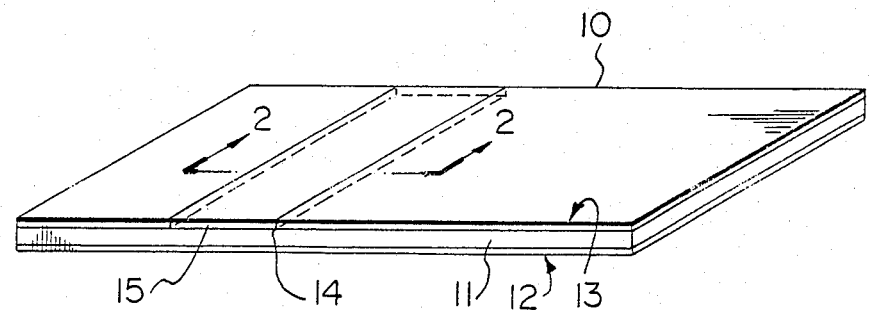
FIG. 1 is a perspective view of an identification card in accordance with this invention.
Figure 2:
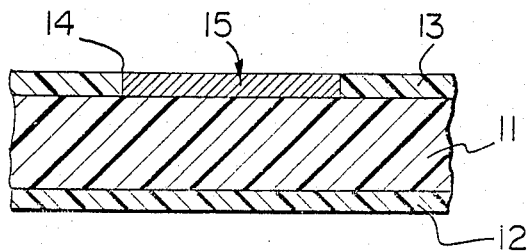
FIG. 2 is a section view on the line 2—2 of FIG. 1.

Referring now to the drawings, identification card 10 has a core stock 11 which may be of polyvinyl chloride, a polyester such as the product known under the trade mark MYLAR or polystyrene. It usually has embossed or nonembossed information on its surface. A typical thickness of core stock 11 is 10 to 26 mil. On the front and back surfaces of core stock 11 there are protective front and back transparent plastic films 12 and 13 respectively. These films which typically have a thickness of about 2 mil, are printed by screen printing to leave a drop out area 14. In drop out area 14 there is printed a magnetic encoding panel 15, also by screen printing. A batch of cards such as 72 cards, can conveniently be printed with the magnetic encoding panel at the same time. A suitable formulation for printing the magnetic encoding panel is 60% iron oxide of the type used in making magnetic tapes such as B.A.S.F. magnetic pigment No. 345 in 40% of a vehicle. As an example of a vehicle, the following may be used: 60 parts of nitrocellulose resin, 30 parts of cellulose acetate, 10 parts of a wetting agent such as the product known under the trade name Areoplaz, 1 part of silicone and 5 parts of ethyl alcohol.

It has been conventional practice to polish the protective film at the surfaces of identification cards and such polishing step is, according to an aspect of this invention, conducted after both the protective film and the magnetic encoding panel have been printed.

It has surprisingly been found that dramatic improvements in the life of the magnetic panel have been achieved by the practice of this invention. It has been found that a conventional magnetic tape will fail after approximately 500 passes through a reader. A screen printed magnetic stripe applied as described above but without the polishing step will last for about 1500 passes through a reader. However, when the screen printed stripe is polished it will last for about 3600 passes through a conventional reader.

A typical polishing treatment involves the application of heat and pressure in the following manner:

A lift of cards, each interleaved between highly polished chrome plates for a gloss finish or grained chrome plates for a matt finish, is subjected to hydraulic pressure of 1000 pounds per square inch and heat 265° F. for approximately nine minutes with an additional eleven minutes of cooling time.

Figure 3:
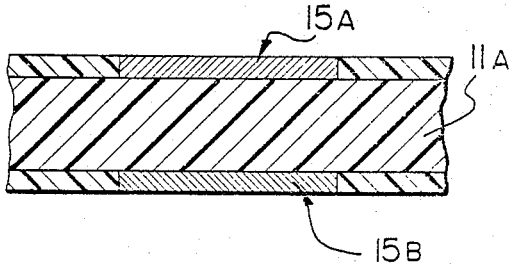
FIG. 3 is a section view of an alternative embodiment of this invention.

In the embodiment shown in FIG. 3, magnetic encoding panels 15A and 15B are printed on both sides of core 11A.

In addition to the advantages that have previously been described, the invention results in greater flexibility in that the panel need not be in the shape of a section of tape but can be in any shape desired for aesthetic or functional reasons. There is also a cosmetic improvement as the panel gives the impression that it is an integral part of the identification card as compared with the appearance of the conventional magnetic tape.

We claim:

1. A method of making an identification card having a magnetic encoding panel comprising the steps of applying a protective film to a core stock to leave a drop out area, printing a magnetic encoding panel on said core stock in said drop out area, and polishing both the protective film and the printed magnetic encoding panel.

2. A method as in claim 1, in which the polishing is with heat and pressure.

3. An identification card comprising a core stock and on one surface thereof a protective coating applied to leave a drop out area, a printed magnetic encoding panel in said drop out area in direct contact with the core stock and having substantially the same thickness as said protective coating, both said protective coating and magnetic encoding panel being polished.

4. A method of making an identification card having a magnetic encoding panel comprising screen printing a protective film surface having a drop out area on a surface of a base stock, screen printing a magnetic encoding panel in said drop out area and simultaneously polishing the protective film and printed magnetic encoding panel under heat and pressure.

* * * * *